No. 636,224. Patented Oct. 31, 1899.
H. B. CARLTON & E. F. HATHAWAY.
PHOTOGRAPHIC SHUTTER.
(Application filed Jan. 3, 1899.)
(No Model.) 3 Sheets—Sheet 1.
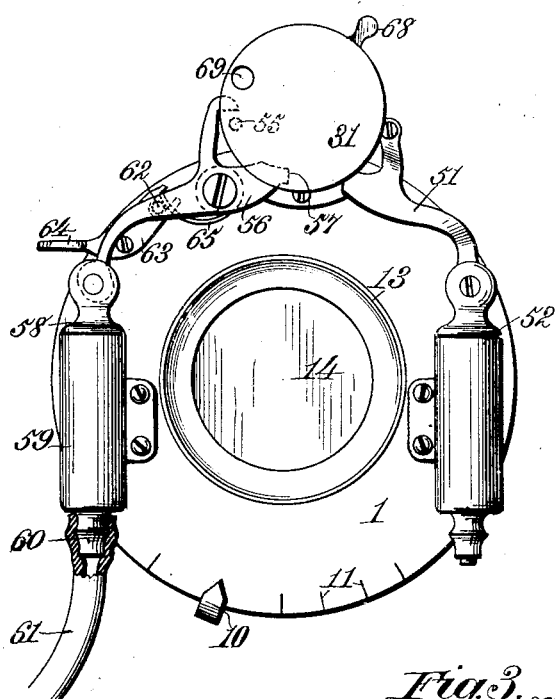
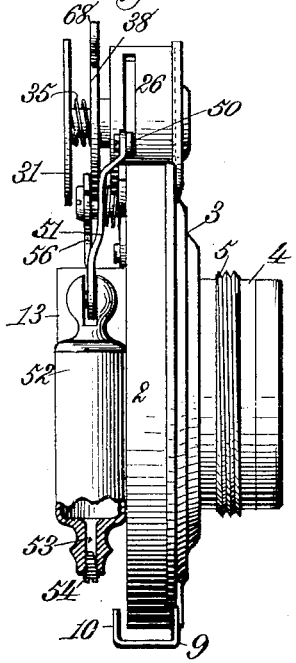
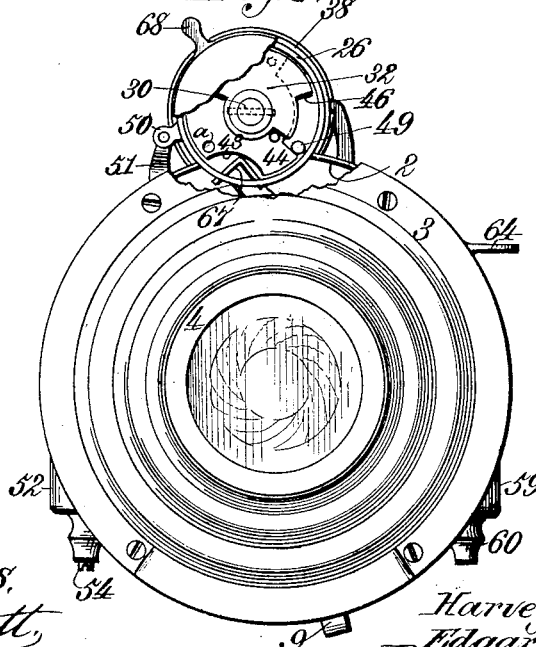
Witnesses,
Robert Garrett
W. B. Keely
Inventors
Harvey B. Carlton,
Edgar F. Hathaway,
By James L. Norris
Atty.

No. 636,224. Patented Oct. 31, 1899.
H. B. CARLTON & E. F. HATHAWAY.
PHOTOGRAPHIC SHUTTER.
(Application filed Jan. 3, 1899.)
(No Model.) 3 Sheets—Sheet 2.
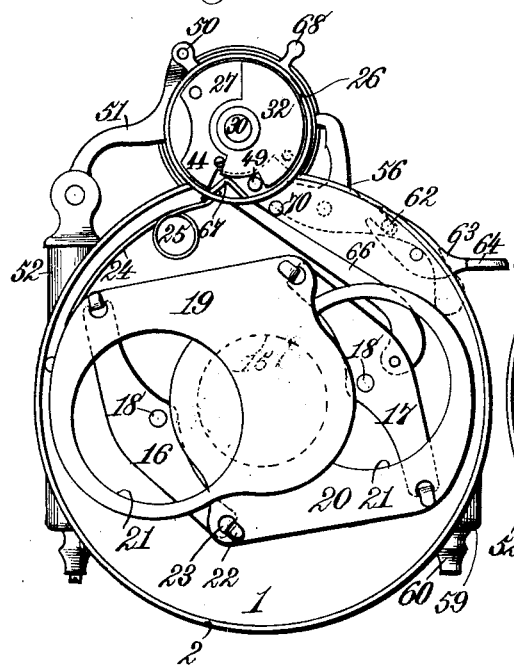
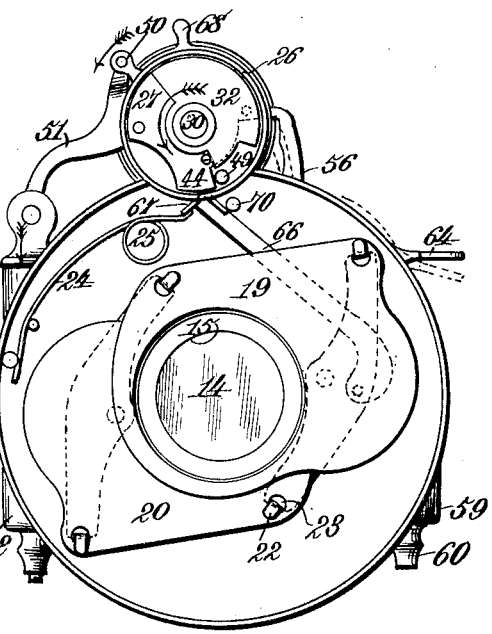
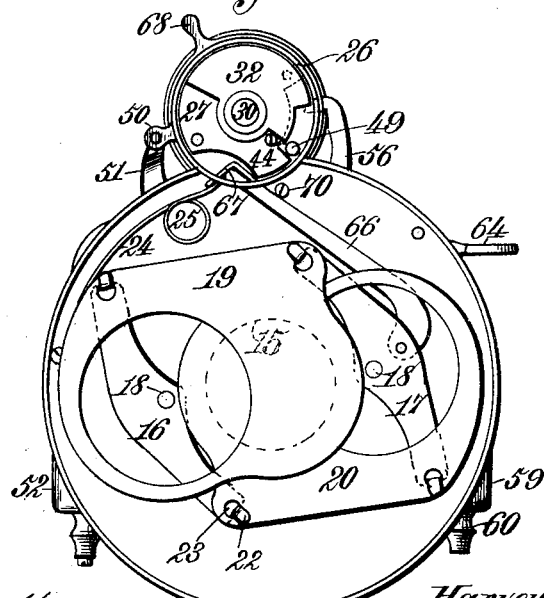
Witnesses.
Robert Everett
Inventors.
Harvey B. Carlton
Edgar F. Hathaway
By James L. Norris
Atty.

No. 636,224. Patented Oct. 31, 1899.
H. B. CARLTON & E. F. HATHAWAY.
PHOTOGRAPHIC SHUTTER.
(Application filed Jan. 3, 1899.)
(No Model.) 3 Sheets—Sheet 3.
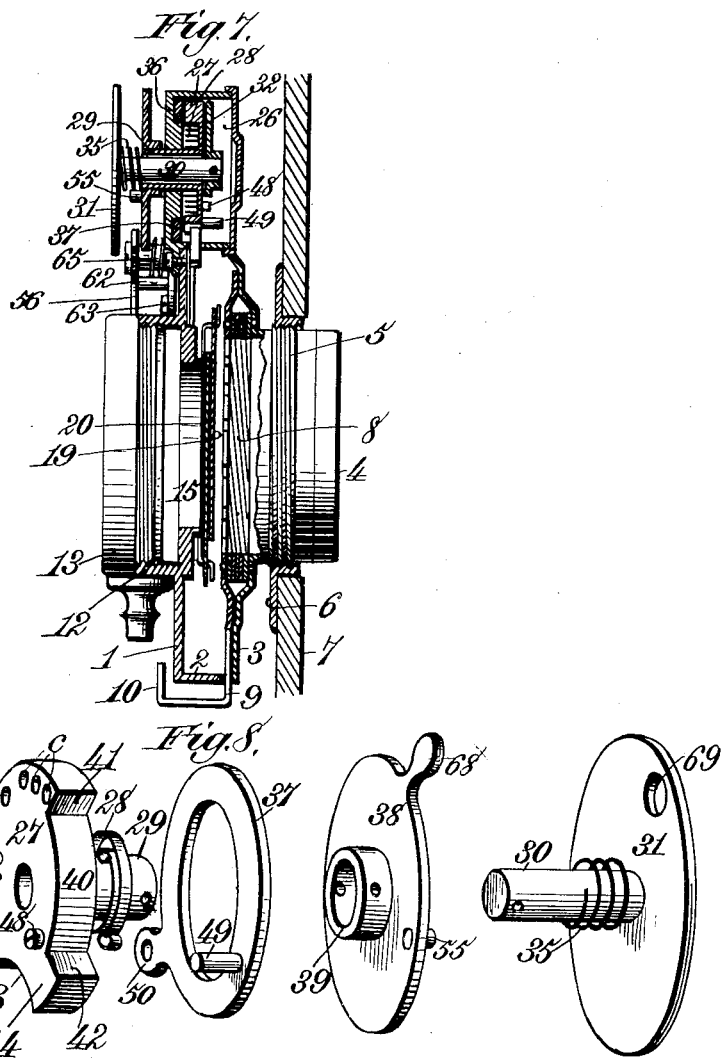

UNITED STATES PATENT OFFICE.

HARVEY B. CARLTON AND EDGAR F. HATHAWAY, OF ROCHESTER, NEW YORK, ASSIGNORS TO THE ROCHESTER CAMERA AND SUPPLY COMPANY, OF SAME PLACE.

PHOTOGRAPHIC SHUTTER.

SPECIFICATION forming part of Letters Patent No. 636,224, dated October 31, 1899.

Application filed January 3, 1899. Serial No. 700,995. (No model.)

*To all whom it may concern:*

Be it known that we, HARVEY B. CARLTON and EDGAR F. HATHAWAY, citizens of the United States, residing at Rochester, in the county of Monroe and State of New York, have invented new and useful Improvements in Photographic Shutters, of which the following is a specification.

This invention relates to photographic shutters, and particularly to that class of such devices wherein two overlapping shutter-leaves, each having an aperture adapted to be brought into coincidence with the lens-tube, are so arranged as to normally cover the lens-tube to exclude the light from the camera, means being provided for moving said shutter-leaves one past the other to bring their apertures into alinement with the lens-tube to permit the passage of the light therethrough and then return them to their normal position to exclude the light, both hand-operated and automatic means being provided for regulating the length of time the shutter-leaves remain open to govern the length of the exposure or the period of time during which the light is permitted to enter the camera.

The present invention has for its object, first, to provide novel mechanism for actuating the shutter-leaves in such manner that they are instantly opened and after having remained open the desired length of time are instantly closed, whereby the length of exposure is rendered practically independent of the time occupied by the shutter-leaves in opening and closing, thus giving the sides of the sensitized plate or film the same length of exposure that is given to its center; second, to provide novel mechanism for operating the shutter-leaves by means of which the speed of the shutter-leaves in their opening and closing movements is rendered invariable; third, to provide, in combination with a motive device operating first to open the shutter-leaves and then close them, a novel retarding device constructed to determine the length of time intervening between the moment the shutter-leaves are opened and the moment they begin to close, and, finally, it has for its object to provide improved mechanism operating in a novel manner for controlling the action of the shutter-leaves and to simplify the construction, cheapen the production, and render more reliable and certain this class of photographic shutters generally.

To these ends our invention consists in the features and in the construction, combination, and arrangement of parts hereinafter described, and particularly pointed out in the claims following the description, reference being had to the accompanying drawings, forming a part of this specification, wherein—

Figure 1 is a view in front elevation of our improved shutter. Fig. 2 is a side elevation of the same. Fig. 3 is a rear elevation, the case being partially removed to show the motive device. Fig. 4 is a detail view in elevation, showing the mechanism set for actuating the shutter-leaves and just in the act of opening the latter. Fig. 5 is a similar view showing the shutter-leaves opened and the parts in position for holding them open. Fig. 6 is another similar view showing the shutter-leaves closed and the parts in their corresponding position. Fig. 7 is a vertical central sectional view; and Fig. 8 is a detail perspective view of the motive device, the parts being shown separated.

Referring to the drawings, the numeral 1 indicates a flat circular casing provided upon its periphery with an annular rearwardly-projecting flange 2, on the rear end of which is fixed a cover-plate 3. This casing contains the shutter-leaves and their immediate operating parts. Fitted in an aperture formed centrally in the cover-plate 3 is the lens-tube 4, which is preferably threaded exteriorly, as at 5, whereby it may be removably fitted in an interiorly-threaded sleeve 6, fixed in the front board 7 of the camera (see Fig. 7) in a usual and well-known manner. Within the lens-tube is arranged a lens or plurality of lenses of any approved or preferred construction. Attached to the front side of the coverplate 3, immediately in front of the lens-tube, is an "iris diaphragm" 8 of well-known and ordinary construction and provided with an operating-arm 9, having an upturned end 10, constituting a pointer which is adapted to register with any one of a series of graduations 11, marked on the front of the casing 1. By turning the arm 9 the size of the aperture of the diaphragm is adjusted to suit the will of the operator in an ordinary manner, and the relative size of the aperture will be indicated by the pointer 10. There is nothing novel in the construction of this diaphragm, and it is only slightly indicated and briefly alluded to to show its location and arrangement relative to the shutter-leaves. Formed centrally on the front of the casing 1 is an annular interiorly-threaded flange 12, in which is screwed a sleeve 13, carrying an objective lens 14, and formed in the casing 1, concentrically with the flange 12, is a view-aperture 15. To the rear side of the casing 1 and upon opposite sides of the view-aperture 15 are pivoted intermediate their ends levers 16 and 17, the pivots 18 of said levers being arranged slightly one above the other, as most clearly shown in Figs. 4, 5, and 6. The opposite ends of said levers are loosely attached to the shutter-leaves 19 and 20. As shown, each of said shutter-leaves consists of a thin leaf approximately rectangular in shape and provided at one end with an aperture 21, and said aperture should be at least as large as the view-aperture 15. The shutter-leaves are formed of opaque and preferably of very light material—such as hard rubber, for example. The upper ends of the levers 16 and 17 are attached to the upper opposite corners of one of the shutter-leaves, as 19, while the lower ends of said levers are in like manner attached to the other shutter-leaf 20. As a convenient means for loosely connecting the levers and shutter-leaves we prefer to turn up the ends of the levers, as at 22, and loosely insert such turned-up ends in perforations 23, formed at appropriate points in said shutter-leaves. The shutter-leaves should be so connected to the levers that their apertures 21 normally lie on opposite sides of the view-aperture 15, or, in other words, so that their solid portions normally cover said view-aperture, and to hold them in such a position we provide a spring 24, which operates in a manner which will hereinafter be described. One of the shutter-leaves being carried by the upper ends of the levers and the other shutter-leaf by the lower ends thereof, it will be readily understood that as said levers are oscillated about their pivots the shutter-leaves will slide one past the other in nearly a right line. Hence when the levers are swung from the position shown in Fig. 4 (in which the shutter-leaves are in their closed position) to the position shown in Fig. 5 the shutter-leaves will be moved past one another in a direction to bring their apertures into coincidence, thus uncovering the view-aperture to admit the light to the camera and make an "exposure." As soon as released the spring 24 will instantly return the shutter-leaves to the position shown in Fig. 4, or to "closed position."

We have shown and described a type of shutter-leaves and the action of the same for use with our photographic shutter; but we wish it to be understood that we may use any of the ordinary and well-known types of shutter-leaves in connection with our controlling and operating mechanism, which forms the chief part of our invention.

We have devised improved mechanism for actuating the shutter-leaves and for controlling their action in a novel manner, which will now be described. This part of the apparatus comprises a "motive device" and controlling mechanism so constructed and arranged that the shutter-leaves may be actuated to effect an "instantaneous," "time," or "bulb" exposure and is constructed as follows: Formed with or attached to the casing 1 is a cylindrical casing 26, which incloses the motive device. As shown most clearly in Figs. 7 and 8 of the drawings, the numeral 27 indicates a spring-barrel having coiled therein a convolute spring 28. The barrel is formed with a forwardly-projecting sleeve 29, which is journaled in an aperture formed centrally in the front of the case 26. The sleeve is open at its opposite ends, and loosely passing therethrough is a shaft 30, on the forward end of which is rigidly fixed an adjusting-disk 31. On the opposite end of the shaft 30 is keyed a cam-plate 32, on the forward face of which is fixed a pin 33. The pin 33 is adapted to engage any one of a series of pin-holes 34, formed in the rear face of the spring-barrel 27 to lock said cam-plate and spring-barrel together, and in order to hold the pin to its seat in the pin-hole in which it may be inserted a coiled spring 35 is disposed about the shaft 30 and bears at one end against the disk 31 and at its other end against the end of the sleeve 29. This spring being placed in position under compression operates to draw the shaft 30, and with it the cam-plate 32, forward, thus holding the pin seated in one of the pin-holes. By pressing the disk 31 inward the pin will be forced out of the pin-hole, and then by turning said disk the cam-plate may be freely rotated, so as to change its position relatively to the spring-barrel, and by then releasing the disk the spring 35 will again draw the cam-plate and spring-barrel together, forcing the pin into one of the pin-holes and locking the cam-plate and spring-barrel in their adjusted positions for the purpose hereinafter described. Adapted to freely rotate in an annular groove 36, formed in the inner face of the front of the casing 26, is a ring 37, that is held to its seat by the spring-barrel 27. Keyed to the outer end of the sleeve 29 is a disk 38, which is provided on its rear face with a hub 39, arranged to bear against the front of the casing 26, and thus hold the parts in place. As described, the disk 31 and cam-plate 32 are permanently fastened together rigidly, and the spring-barrel 27 and disk 38 are in like manner fastened together. Hence when the adjustment-disk 31 is in its normal position the pin 33 will be in engagement with one of the pin-holes in the spring-barrel, and then the adjustment-disk 31, disk 38, spring-barrel 27, and cam-plate 32 will all be locked together and must rotate as one. The periphery of the spring-barrel 27 is recessed or mutilated for a suitable distance, as at 40, forming two shoulders 41 and 42, and another recess 43, shown in the drawings as being practically semicircular in shape, is cut in the periphery of the spring-barrel a short distance from the recess 40, leaving between them what constitutes, in effect, a cam 44. The cam-plate 32 is formed with a peripheral cam portion 45, having an abrupt shoulder 46, and by turning the cam-plate relatively to the spring-barrel the slot 40 in the latter will be more or less covered, and thereby lengthened or shortened, by the cam portion 45 of the cam-plate, or, in other words, the shoulders 42 and 46 will be brought nearer together or farther apart, for the purpose presently made apparent. The cam-plate is also provided with a shoulder 47, which is adapted to abut a pin 48 on the face of the spring-barrel and prevent the cam-plate from being turned too far. On the rear face of the ring 37 is fixed a pin 49, which projects into the recess 40 between the shoulders 41 and 42 of the spring-barrel, and said plate is also provided with a peripheral perforated ear 50, to which is pivotally connected one end of an arm 51, the other end of said arm being connected to the plunger of a dash-pot. Said dash-pot consists of a hollow cylinder 52, rigidly attached to one side of the front of the casing 1, and is provided at its lower end with an air escape or vent 53. (See Fig. 2.) The size of the escape-opening in the vent may be regulated by a screw 54, of ordinary and well-known construction. In the cylinder 52 is adapted to freely reciprocate an inverted cylindrical cup constituting the plunger. Owing to the smallness of the air-vent it will be evident that the plunger can descend by the application of a moderate force but slowly, and this is the retarding device before referred to and the operation of which will hereinafter be described. To the front of the face of the disk 38 is fixed a pin 55, which acts as a stop to hold the motive device in its set position in the following manner: Pivoted to the front face of the casing 1 is a pivoted dog 56, one end of which is formed with a square shoulder 57, that is adapted to engage behind the pin 55 and hold the motive device in its set position. The other end of said dog loosely rests in the bifurcated end of a hollow plunger 58, that is arranged to freely reciprocate in a hollow cylinder 59, rigidly attached to one side of the front face of the casing 1. The lower end of the cylinder is provided with a nipple 60, over which is fitted one end of a rubber tube 61, provided at its opposite end with a hollow elastic bulb, as usual. The dog 56 is also provided with a pin 62, which is engaged by the forked end of a pivoted releasing-lever 63, provided at its opposite end with a finger 64. By these means the dog 56 can be thrown into and out of engagement with the pin 55 either by means of the bulb or directly by hand. The dog is normally held in engagement with the pin 55 by a spring 65, one end of which is fixed and the other bears against the pin 62 on the dog, thus operating to throw the shoulder 57 of the dog up, so as to engage the pin. The connection between the shutter-leaves and the motive device consists of an arm 66, one end of which is pivotally connected to one of the levers, as 17, while the other or free end is provided with a hook-shaped flange 67 underneath, which bears the end of the spring 24, before described. The spring 24 is attached at one end to the casing and at its other end bears beneath flange 67 on the arm 66, and in order to increase its resiliency the spring is preferably provided intermediate its ends with a coil or loop 25. The spring operates to lift the arm 66 lengthwise, thus also moving the shutter-leaves to their closed position when nothing obstructs such movement of the arm. In order to set the motive device, a handle or finger-piece 68 is formed on or attached to the disk 38. As clearly shown in Fig. 8, the pin-holes 34 in the spring-barrel are set at different distances apart, and this is for the reason that by changing the pin 33 of the cam-plate from one pin-hole to another the action of the motive mechanism, and consequently the character of the exposure effected, will be altered, as will be explained hereinafter. For example, when the pin is inserted in the hole $a$ the parts will be set for bulb exposure, when inserted in the hole $b$ the parts will be set to effect an instantaneous exposure, and when inserted in either of the holes $c$ the parts will be set for time exposure, the different holes $c$ being for different lengths of time exposures—as, for example, seconds and fractions of seconds. As before described, the pin is changed from one pin-hole to another by pressing in the disk 31 and then turning it to turn the cam-plate to the proper position to bring the pin opposite the pin-hole desired. In order that the operator may do this with ease and certainty, we mark certain characters on the front face of the setting-disk 38, which correspond exactly in position with the pin-holes and form a peep-hole 69 in the disk 31, through which the characters may be viewed one at a time. Thus if an instantaneous exposure is desired the disk 31 will be pushed in and turned until the character "I" appears opposite the peep-hole. Then the pin 33 will be opposite the pin-hole $b$, and by releasing the disk the spring 35 will force the pin into the pin-hole and the parts will be in position to effect an instantaneous exposure.

The operation of this part of the invention is as follows: When the parts are in a state of rest, or, in other words, the camera is not in actual use, the parts will be in the position shown in Figs. 3 and 6, and the end of the arm 66 will then rest in the recess 43, and consequently the shutter-leaves will be closed. Let it be assumed that it is desired to take a time exposure. The disk 31 is then pushed in and turned until the character on the setting-disk indicating the time exposure of the length desired appears through the peep-hole 69, when the disk is released and the pin 33 enters the proper pin-hole. This operation fixes the cam-plate in such a position relatively to the spring-barrel that the shoulder 46 of the cam-plate is brought within a certain distance of the shoulder 42 of the spring-barrel. The disk 31, setting-disk 38, spring-barrel 27, and cam-plate 32 now stand locked together, so as to rotate in unison. By now turning the setting-disk 38 by means of the handle 68 in the direction of the arrow, Fig. 1, the setting-disk, disk 31, spring-barrel, and the cam-plate are all partially rotated into the position shown in Fig. 4. This operation winds up the spring 28 in the spring-barrel and carries the pin 55 on the setting-disk around toward the left, and in its movement said pin strikes against the edge of the upper end of the dog 56 and depresses it until the pin 55 has passed the end of the dog, whereupon the dog is returned to its former position by its spring 65, and the pin 55 bears against the shoulder 57 of the dog, thus holding the parts in their set position with the spring 28 wound up. At one part of the operation the shoulder 46 of the cam-plate strikes the pin 49, carried by the loose ring 37, and moves said pin and ring toward the left with it. Previous to this, however, the cam 44 on the spring-barrel has struck and depressed the end of the arm 66 and swept over it until the shoulder 42 has passed the arm, whereupon the arm was returned to its former position by the spring 24 and entered the recess 40 in the spring-barrel, as shown in Fig. 4. This movement communicated to the arm 66 did not affect the shutter-leaves in any manner, as the arm was given no endwise movement, but merely had its upper end pushed aside. The arm in its normal position bears at its upper edge against a pin 70, fixed in the casing 1. The parts are now all set and ready to effect the exposure. This is done by depressing the free end of the releasing-lever 63, as shown by dotted lines in Fig. 5, which raises the adjacent end of the dog 56 and depresses the upper end thereof, throwing the shoulder 57 down below the pin 55. Upon this the spring 28 immediately turns all the parts, excepting the ring 37, in the direction of the arrow, Fig. 5, and the shoulder 42 immediately strikes the end of the arm 66 and forces it down into the position shown in Fig. 5, which instantly opens the shutter-leaves. The cam 44 swiftly sweeps over the end of the arm 66 until it strikes the pin 49, carried by the loose ring 37. It will be remembered that this ring is connected to the dash-pot plunger by the arm 51. Hence when the pin 49 was moved around into position in setting the mechanism the plunger was raised. It therefore follows that when the swiftly-moving cam 44 strikes said pin 49 in order to move said pin along with it it must force down said plunger and in doing so its movement is retarded, and during the remainder of its movement over the end of the arm 66 its speed is relatively slow. When the cam 44 has completely passed over the end of the arm, said arm is immediately raised up into the recess 43 of the spring-barrel by its spring 24, whereupon the shutter-leaves are instantly closed, completing the exposure. The parts are then in the position shown in Fig. 6. From the foregoing it will be readily understood that when the arm 66 is struck by the cam 44 the shutter-leaves are instantly opened and that the cam passes so swiftly over the end of the arm that the shutter-leaves have remained open but an inconceivably brief period of time when the cam strikes the pin 49—so brief, in fact, as to form no practical part of the exposure. When the cam 44 strikes the pin 49, however, it is retarded in the manner described during the rest of its movement over the end of the arm. Hence it is the duration of the exposure is determined by how soon the cam strikes the pin 49 after depressing the arm to open the shutter-leaves, and this is determined by so setting the cam-plate as to cause its shoulder 46 to sooner or later engage said pin and move it forward in setting the motive device, for the sooner said shoulder engages said pin the nearer the pin will be moved toward the end of the arm and the sooner, therefore, will it be engaged by the cam, thereby retarding the cam during a greater portion of its sweep over the end of the arm and holding open the shutter-leaves a corresponding period of time. From all of which it follows that by causing the pin 33 to engage one or the other of the pin-holes c of the spring-barrel the length or duration of the time exposure is regulated with great accuracy.

Instead of releasing the dog by means of the hand releasing-lever 56 the same result could have been accomplished, of course, by compressing the elastic bulb, thus lifting the plunger 58 and with it the end of the dog, and this is true of all the different exposures. It will be noted that the movement of the shutter-leaves in closing is not retarded, but that the retarding device operates to retard the motive device, and when the moment arrives for closing the shutter-leaves they close instantly. Hence, as has been before stated, the shutter-leaves are both opened and closed instantly, whereby the sides of the plate or film receive the same length of exposure as the center, which is not the case in those shutters wherein the retarding device operates to cause the shutter-leaves to close more or less slowly, thus causing the center of the plate or film to receive a longer exposure than the sides, resulting in a negative a portion of which will have been properly exposed and the other portion over or under exposed, or one part underexposed and the other part overexposed. In the present invention the speed of the shutter-leaves in both opening and closing is invariable, and this is true of both time and instantaneous exposures.

In making instantaneous exposures the operation is as follows: The disk 31 is first pushed in and the cam-plate rotated until the character "I" appears through the peep-hole 69 in the disk, when the latter is released, whereupon the spring 35 will draw the pin 33 of the cam-plate into the pin-hole b of the spring-barrel. This will fix the cam relatively to the spring-barrel in such a position that the shoulder 46 will be approximately coincident with the shoulder 41. The motive device is then set by turning the handle 68 in precisely the same manner before described, all the same results following excepting that in the present instance the shoulder 46 does not strike the pin 49, and the latter, therefore, is not moved toward the left or toward the end of the arm 66. When the exposure is to be made, the dog is disengaged from the pin 55, as before, whereupon the parts will rotate, and the shoulder 42 will immediately force down the arm 66, instantly opening the shutter-leaves. The cam 44 will swiftly sweep over the end of the arm, and the pin 49 not being in its path to interrupt it its movement will be one swift sweep over the end of the arm, permitting the latter to immediately fly up into the recess 43 and instantly closing the shutter-leaves, the time the shutter-leaves remain open being the time the cam 44 occupies to make one uninterrupted swift sweep over the end of the arm, which in practice is but a small fraction of a second.

Having described our invention, what we claim is—

1. In a photographic shutter, the combination with a device for admitting the light to and excluding it from the camera to effect the exposure, of a motive device for instantly opening the exposing device and temporarily holding it fully open, a spring for instantly closing the exposing device, a retarding device for retarding the movement of the motive device after it has completely opened the exposing device and thereby temporarily prevent the spring from closing the latter until the motive device has completed its movement, and means for throwing said retarding device into operation at different periods of the movement of the motive device to vary the duration of the exposure, substantially as described.

2. In a photographic shutter, the combination with a device for admitting the light to and excluding it from the camera to effect the exposure, of a motive device for instantly opening the exposing device and temporarily holding it fully open, a spring for instantly closing the exposing device, a retarding device for retarding the movement of the motive device after it has completely opened the exposing device and thereby temporarily prevent the spring from closing the latter until the motive device has completed its movement, means for throwing said retarding device into operation at different periods of the movement of the motive device to vary the duration of the exposure, and means for throwing said retarding device entirely out of operation at the will of the operator, substantially as described.

3. In a photographic shutter, the combination with a device for admitting the light to and excluding it from the camera to effect the exposure, of a motive device for instantly opening the exposing device and temporarily holding it open, a spring for instantly closing it, and means for varying the speed of the motive device at different periods of its movement to regulate the duration of the exposure, substantially as described.

4. In a photographic shutter, the combination with a device for admitting the light to and excluding it from the camera to effect the exposure, of a motive device for instantly opening the exposing device and temporarily holding it open, a spring for instantly closing it, means for varying the speed of the motive device at different periods of its movement to regulate the duration of the exposure, and means for throwing said speed-regulating movement into or out of operation, substantially as described.

5. In a photographic shutter, the combination with a device for admitting the light to and excluding it from the camera to effect the exposure, of a motive device for instantly opening the exposing device and temporarily holding it open, a spring for instantly closing it, means for varying the speed of the motive device at different periods of its movement to regulate the duration of the exposure, and means under the control of the operator for throwing the said speed-regulating means into operation at any predetermined period of the movement of the motive device, substantially as described.

6. In a photographic shutter, the combination with two apertured swinging shutter-leaves, arranged to swing laterally past each other to bring their apertures into and out of coincidence, of a motive device for instantly opening the shutter-leaves, a spring for instantly closing them, a retarding device for retarding the movement of the motive device after it has completely opened the shutter-leaves and thereby temporarily prevent the operation of the shutter-leaf-closing mechanism until the motive device has completed its movement, and means for throwing said retarding device into operation at different periods of the movement of the motive device to vary the duration of the exposure, substantially as described.

7. In a photographic shutter, the combination with two apertured swinging shutter-leaves arranged to swing laterally past each other to bring their apertures into and out of coincidence, of a motive device for instantly opening said shutter-leaves, a spring for instantly closing them, a retarding device for retarding the movement of the motive device after it has opened the shutter-leaves and thereby temporarily prevent the operation of the shutter-leaf-closing mechanism until the motive device has completed its movement, means for throwing said retarding device into operation at different periods of the movement of the motive device to vary the duration of the exposure, and means for throwing said retarding device out of operation at the will of the operator, substantially as described.

8. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam has passed over the arm, and means for retarding the speed of the cam to defer the action of the spring in closing the shutter-leaves, substantially as described.

9. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam has passed over the arm, and means for retarding the speed of the cam at different periods of its movement to defer the action of the spring in closing the shutter-leaves, substantially as described.

10. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam is passed over the arm, and a yielding resistance adapted to be placed in the path of the cam at varying distances therefrom to retard its movement and defer the action of the spring in closing the shutter-leaves, substantially as described.

11. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam has passed over the arm, a rotatable ring adapted to rotate independent of the cam, a dash-pot connected to said ring, a pin carried by said ring, and means for rotating said ring to place said pin in the path of the cam, whereby, when the cam has depressed the arm to open the shutter-leaves it will strike said pin and be retarded in its further movement by the dash-pot, substantially as described and for the purpose specified.

12. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam has passed over the arm, a rotatable ring adapted to rotate independently of the cam, a dash-pot connected to said ring, a pin carried by the ring, and means under the control of the operator for rotating the ring to place the pin in the path of the cam to retard the movement of the latter, substantially as described and for the purpose specified.

13. In a photographic shutter, the combination with two apertured swinging shutter-leaves arranged to swing laterally past each other to bring their aperture into and out of coincidence, of an arm for actuating said shutter-leaves, a partially-rotatable spring-actuated cam for depressing said arm to open the shutter-leaves, a spring operating to close the shutter-leaves when the cam has passed over the arm, a rotatable ring, a dash-pot connected to the ring, a pin carried by the ring, a cam-plate arranged to rotate with the cam and having a shoulder arranged to move the pin into the path of the cam, whereby the cam after it has opened the shutters strikes the pin and is retarded in its further movement by the dash-pot, substantially as described.

14. In a photographic shutter, the combination with two apertured swinging shutter-leaves arranged to swing laterally past each other to bring their apertures into and out of coincidence, of an arm for actuating said shutter-leaves, a partially-rotatable spring-actuated cam for depressing said arm to open the shutter-leaves, a spring operating to close the shutter-leaves when the cam has passed over the arm, a rotatable ring, a dash-pot connected to the ring, a pin carried by the ring, a cam-plate arranged to rotate with the cam and having a shoulder arranged to move the pin into the path of the cam, whereby the cam after it has opened the shutter-leaves strikes the pin and is retarded in its further movement by the dash-pot, and means for adjusting the cam-plate relatively to the cam to cause its shoulder to move the pin a greater or less distance, substantially as described and for the purpose specified.

15. In a photographic shutter, the combination with two apertured shutter-leaves arranged to swing laterally past each other to bring their apertures into and out of coincidence, of an arm for actuating said shutter-leaves, a partially-rotatable spring-actuated cam for depressing said arm to open the shutter-leaves, said cam having a series of pin-holes formed in its face, a spring operating to close the shutter-leaves when the cam has passed over the arm, a rotatable ring, a dash-pot connected to the ring, a pin carried by the ring, a cam-plate arranged adjacent to the cam and provided with a stud adapted to engage either of said pin-holes, a shoulder on the cam-plate arranged to move the pin into the path of the cam, whereby the cam after it has opened the shutter-leaves strikes the pin and is retarded in its further movement by the dash-pot, and means for adjusting the stud on the cam-plate in either of the holes of the cam at will, substantially as described and for the purposes specified.

16. In a photographic shutter, the combination with two apertured shutter-leaves arranged to swing laterally past each other to bring their apertures into and out of coincidence, of an arm for actuating said shutter-leaves, a partially-rotatable spring-actuated cam for depressing said arm to open the shutter-leaves, said cam having a series of pin-holes formed in its face, a spring operating to close the shutter-leaves when the cam has passed over the arm, a rotatable ring, a dash-pot connected to the ring, a pin carried by the ring, a cam-plate arranged adjacent to the cam and provided with a stud adapted to engage either of said pin-holes for yieldingly holding the stud in engagement with the pin-holes, a shoulder on the cam-plate arranged to move the pin into the path of the cam, whereby the cam after it has opened the shutter-leaves strikes the pin and is retarded in its further movement by the dash-pot, and means for adjusting the stud on the cam-plate in either of the holes of the cam at will, substantially as described and for the purpose specified.

17. In a photographic shutter, the combination with two apertured shutter-leaves arranged to swing laterally past each other to bring their apertures into and out of coincidence, of an arm for actuating said shutter-leaves, a rotatable shaft having a turning disk fixed on one end, a shouldered cam-plate fixed on the other end, a spring-actuated cam loosely sleeved on the shaft and provided on its face with a series of pin-holes, said cam operating to depress said arm to open the shutter-leaves, a spring for closing the shutter-leaves when the cam has passed over the arm, a rotatable ring, a dash-pot connected to the ring, a pin carried by the ring, a stud on the cam-plate adapted to fit either of the pin-holes in the cam, a spring for moving the shaft endwise to hold the stud in the pin-hole to which it may be adjusted, means for setting the spring, and a releasing device, substantially as shown and described and for the purpose specified.

18. In a photographic shutter, the combination with two apertured shutter-leaves arranged to swing laterally past each other to bring their apertures into and out of coincidence, of an arm for actuating said shutter-leaves, a rotatable shaft having a turning disk fixed on one end, a shouldered cam-plate fixed on the other end, a spring-actuated cam loosely sleeved on the shaft and provided on its face with a series of pin-holes, said cam operating to depress said arm to open the shutter-leaves, a spring for closing the shutter-leaves when the cam has passed over the arm, a rotatable ring, a dash-pot connected to the ring, a pin carried by the ring, a stud on the cam-plate adapted to fit either of the pin-holes in the cam, a spring for moving the shaft endwise to hold the stud in the pin-holes to which it may be adjusted, means for setting the cam-actuating spring, and a releasing device, the said turning disk being provided with a peep-hole, and a disk fixed on the sleeve of the cam, said disk being provided with a series of characters corresponding in position to the pin-holes on the cam, said characters being arranged to be viewed one at a time through the peep-hole in the turning disk, substantially as described and for the purpose specified.

19. In a photographic shutter, the combination with two apertured shutter-leaves arranged to swing laterally past each other to bring their apertures into and out of coincidence, of an arm for actuating said shutter-leaves, a rotatable shaft having a turning disk fixed on one end, a shouldered cam-plate fixed on the other end, a spring-actuated cam loosely sleeved on the shaft and provided on its face with a series of pin-holes, said cam operating to depress said arm to open the shutter-leaves, a spring for closing the shutter-leaves when the cam has passed over the arm, a rotatable ring, a dash-pot connected to the ring, a pin carried by the ring, a stud on the cam-plate adapted to fit either of the pin-holes in the cam, a spring for moving the shaft endwise to hold the stud in the pin-hole to which it may be adjusted, a setting-disk fixed on the sleeve of the cam and provided with a pin, a pivoted dog for engaging said pin to hold the parts in their set position, and a releasing device for disengaging the dog from the pin to put the parts in operation, substantially as described.

In testimony whereof we have hereunto set our hands in presence of two subscribing witnesses.

HARVEY B. CARLTON.
EDGAR F. HATHAWAY.

Witnesses:
HIRAM R. WOOD,
RAYMOND G. PHILLIPS.